US 6,501,085 B2

(12) United States Patent
Yoshida

(10) Patent No.: US 6,501,085 B2
(45) Date of Patent: Dec. 31, 2002

(54) DISTANCE-MEASURING APPARATUS

(75) Inventor: Hideo Yoshida, Saitama (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 0 days.

(21) Appl. No.: 10/101,965

(22) Filed: Mar. 21, 2002

(65) Prior Publication Data

US 2002/0101575 A1 Aug. 1, 2002

Related U.S. Application Data

(62) Division of application No. 09/487,799, filed on Jan. 20, 2000, now Pat. No. 6,399,956.

(30) Foreign Application Priority Data

Jan. 20, 1999 (JP) .............................. 11-012073

(51) Int. Cl.[7] .......................... G03B 13/00; G03B 7/28; G01C 3/00
(52) U.S. Cl. .............................. 250/559.38; 250/214 R; 396/120; 396/125; 356/4.03
(58) Field of Search .................. 250/559.38, 214 R, 250/201.2, 201.4, 201.5, 214 LA; 396/96, 98, 106, 120, 125, 123; 356/3.04, 3.06, 4.07, 4.01, 4.03

(56) References Cited

U.S. PATENT DOCUMENTS

| 5,659,387 | A | 8/1997 | Yoshida | |
|---|---|---|---|---|
| 6,313,907 | B1 | 11/2001 | Yoshida | |
| 6,323,940 | B1 | 11/2001 | Yoshida | |
| 6,399,956 | B1 * | 6/2002 | Yoshida | 250/559.38 |

FOREIGN PATENT DOCUMENTS

JP  7-181038  7/1995

* cited by examiner

Primary Examiner—Kevin Pyo
(74) Attorney, Agent, or Firm—Leydig, Voit & Mayer, Ltd.

(57) ABSTRACT

A distance-measuring apparatus is arranged to project light toward an object at a distance to be measured, receive reflected light from the object, and detect the distance to the measured object through arithmetic operation and integration. In the distance-measuring apparatus, an integrating capacitor discharge/charge to a maximum when a time necessary for a first integration is longer a minimum. In the detection of the distance to the object, when the time necessary for the first integration is longer than the minimum time, a first integration and a second integration by the integrating capacitor are carried out repeatedly.

6 Claims, 8 Drawing Sheets

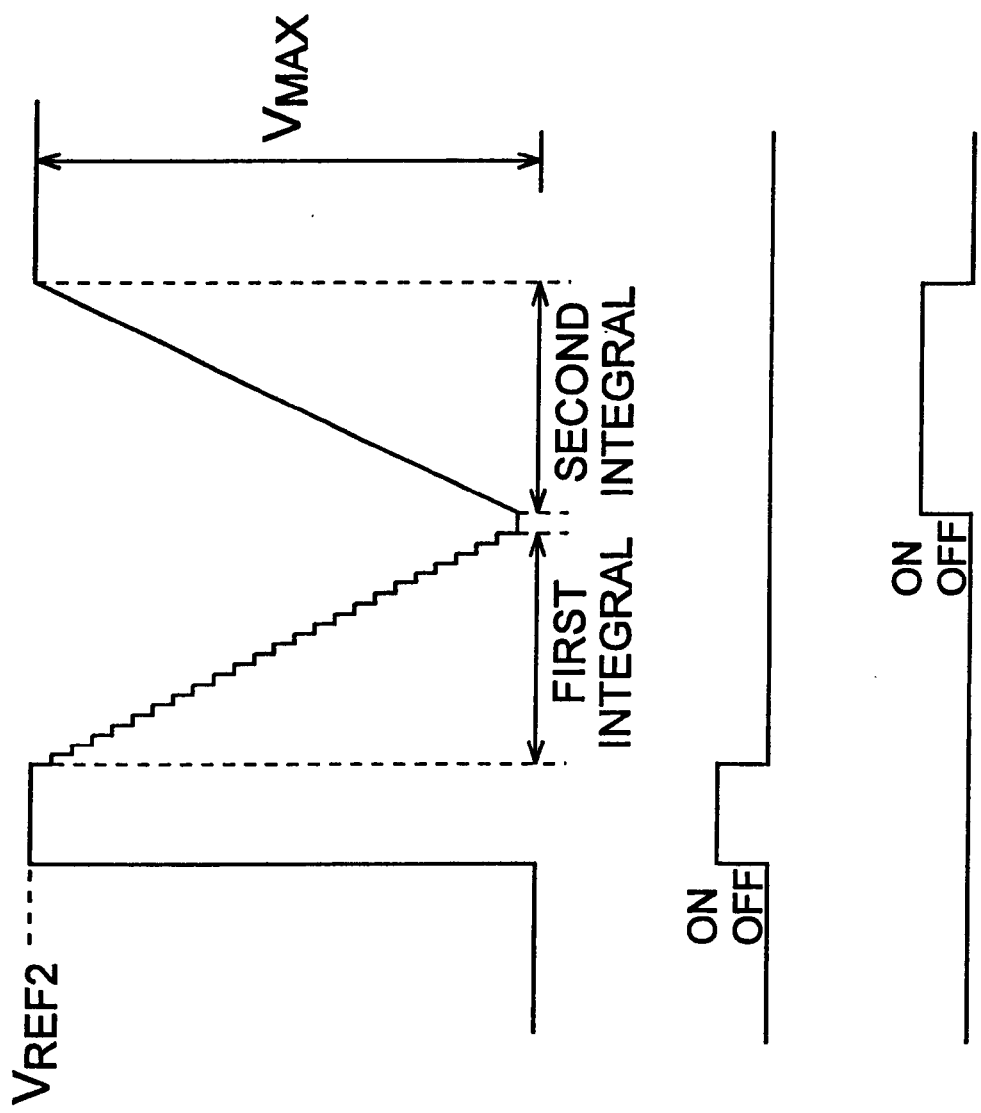

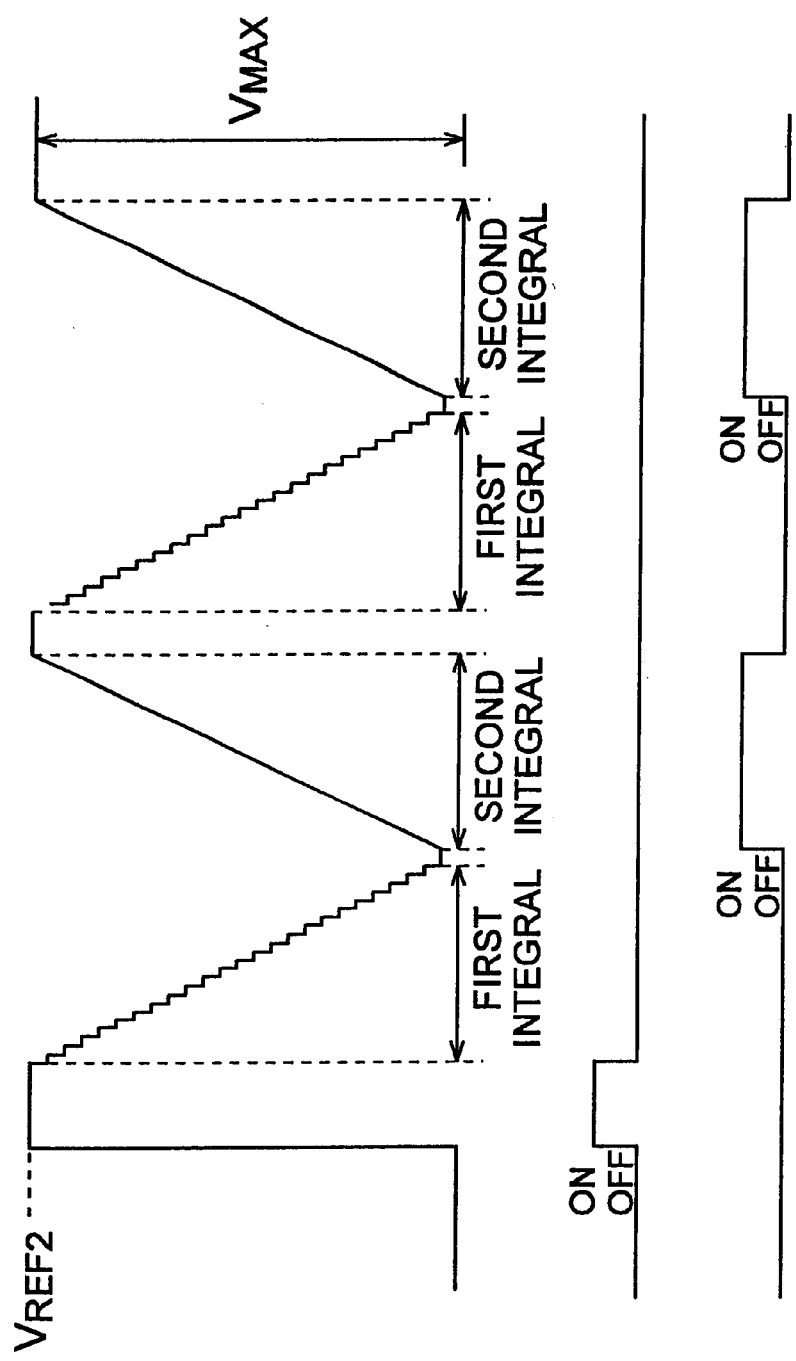

DISTANCE-MEASURING APPARATUS

This application is a division of application Ser. No. 09/487,799, filed Jan. 20, 2000, and now U.S. Pat. No. 6,399,956.

BACKGROUND OF THE INVENTION

1. Field of the Invention

The present invention relates to a distance-measuring apparatus for measuring the distance to an object and, more particularly, to an active distance-measuring apparatus suitably used in cameras and other equipment.

2. Related Background Art

The active distance-measuring apparatus used in the cameras etc. is arranged to project light from an infrared-emitting diode (hereinafter referred to as "IRED") toward the measured object, to receive reflected light of the projected light by a position sensing device (hereinafter referred to as "PSD"), to process a signal from this PSD by a signal processing circuit and an arithmetic circuit to output distance information, and to determine the distance to the measured object by a CPU. Since the distance measurement with only one projection of light can cause an error, it is desirable that a plurality of light projection operations be carried-out to gain a plurality of distance information pieces and that the plurality of distance information pieces be integrated in a fixed period by an integrating circuit to be averaged. The integral of distance information by the integrating circuit is carried out by applying a reference voltage to an integrating capacitor to store charge therein and discharging the capacitor according to the distance information from that state.

SUMMARY OF THE INVENTION

There is, however, a possibility that the distance-measuring apparatus described above fails to carry out accurate distance measurement. Namely, in cases wherein the discharge time of the integrating capacitor is changed depending upon the distance measurement conditions etc., discharge amounts vary depending upon the difference in the discharge time. Therefore, the capacitance of the integrating capacitor can be utilized fully as long as the discharge amount is large. However, if the discharge amount is small, the integral operation cannot be performed by fully utilizing the capacitance of the integrating capacitor, and the measurement accuracy will not be always sufficient.

Therefore, the present invention has been accomplished in view of this point and an object of the present invention is to provide a distance-measuring apparatus that can measure the distance with improved measurement accuracy.

A distance-measuring apparatus according to the present invention is a distance-measuring apparatus comprising: light projecting means for projecting pulses of light toward a measured object; light receiving means for receiving reflected light of the light projected toward the measured object, at a photoreceptive position on a position sensing device according to a distance to the measured object and outputting a signal according to the photoreceptive position; arithmetic means for carrying out.an arithmetic operation based on the signal outputted from the light receiving means and outputting an output ratio signal according to the distance to the measured object; integrating means comprising an integrating capacitor, the integrating means carrying out a first integral in which the signal outputted from the arithmetic means is integrated by discharging/charging the integrating capacitor according to the signal outputted from the arithmetic means and thereafter carrying out a second integral by charging/discharging the integrating capacitor at a constant current, the integrating means comparing a voltage of the integrating capacitor with a reference voltage during the second integral and outputting a comparison result signal according to a result of the comparison; and detecting means for detecting the distance to the measured object, based on the signal outputted from the integrating means; wherein the integrating means is arranged in such a manner that a capacitance of the integrating capacitor is set so as to discharge/charge the integrating capacitor to the maximum when a time necessary for the first integral is minimum, and wherein the integrating means repeatedly carries out the first integral and the second integral of the integrating capacitor when the time necessary for the first integral is longer than the minimum time, in detection of the distance to the measured object.

Another distance-measuring apparatus according to the present invention is a distance-measuring apparatus comprising: light projecting means for projecting pulses of light toward a measured object; light receiving means for receiving reflected light of the light projected toward the measured object, at a photoreceptive position on a position sensing device according to a distance to the measured object and outputting a signal according to the photoreceptive position; arithmetic means for carrying out an arithmetic operation based on the signal outputted from the light receiving means and outputting an output ratio signal according to the distance to the measured object; integrating means comprising an integrating capacitor, the integrating means carrying out a first integral in which the signal outputted from the arithmetic means is integrated by discharging or charging the integrating capacitor according to the signal outputted from the arithmetic means and thereafter carrying out a second integral by charging/discharging the integrating capacitor at a constant current, the integrating means comparing a voltage of the integrating capacitor with a reference voltage during the second integral and outputting a comparison result signal according to a result of the comparison; and detecting means for detecting the distance to the measured object, based on the signal outputted from the integrating means; wherein the integrating means comprises a plurality of integrating capacitors of different capacitances and wherein the integrating means carries out the first integral and the second integral while selecting one of the plurality of integrating capacitors so as to discharge/charge the integrating capacitor to the maximum in detection of the distance to the measured object.

Still another distance-measuring apparatus according to the present invention is a distance-measuring apparatus comprising: light projecting means for projecting pulses of light toward a measured object; light receiving means for receiving reflected light of the light projected toward the measured object, at a photoreceptive position on a position sensing device according to a distance to the measured object and outputting a signal according to the photoreceptive position; arithmetic means for carrying out an arithmetic operation based on the signal outputted from the light receiving means and outputting an output ratio signal according to the distance to the measured object; integrating means comprising an integrating capacitor, the integrating means carrying out a first integral in which the signal outputted from the arithmetic means is integrated by discharging/charging the integrating capacitor according to the signal outputted from the arithmetic means and thereafter carrying out a second integral by charging or discharging the integrating capacitor at a constant current, the integrating means comparing a voltage of the integrating capacitor with a reference voltage during the second integral and outputting a comparison result signal according to a result of the comparison; and detecting means for detecting the distance to the measured object, based on the signal outputted from the integrating means; wherein the integrating means comprises a plurality of current sources of different output current values and wherein the integrating means carries out the first integral while selecting one of the current sources so as to discharge/charge the integrating capacitor to the maximum in detection of the distance to the measured object.

The present invention can maximize the utilization of the dischargeable or chargeable dynamic range of the integrating capacitor on the occasion of the first integral. Therefore, improvement can be made in the distance measurement accuracy.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 4A to FIG. 4C are explanatory diagrams to illustrate the operation of the distance-measuring apparatus of the first embodiment;

FIG. 5A to FIG. 5C are explanatory diagrams to illustrate the operation of the distance-measuring apparatus of the first embodiment;

DESCRIPTION OF THE PREFERRED EMBODIMENTS

The preferred embodiments of the present invention will be described in detail with reference to the accompanying drawings. The following description is based on the examples in which the active distance-measuring apparatus of the embodiments is applied to the distance-measuring apparatus of an autofocusing camera.

First Embodiment

Figure 1:
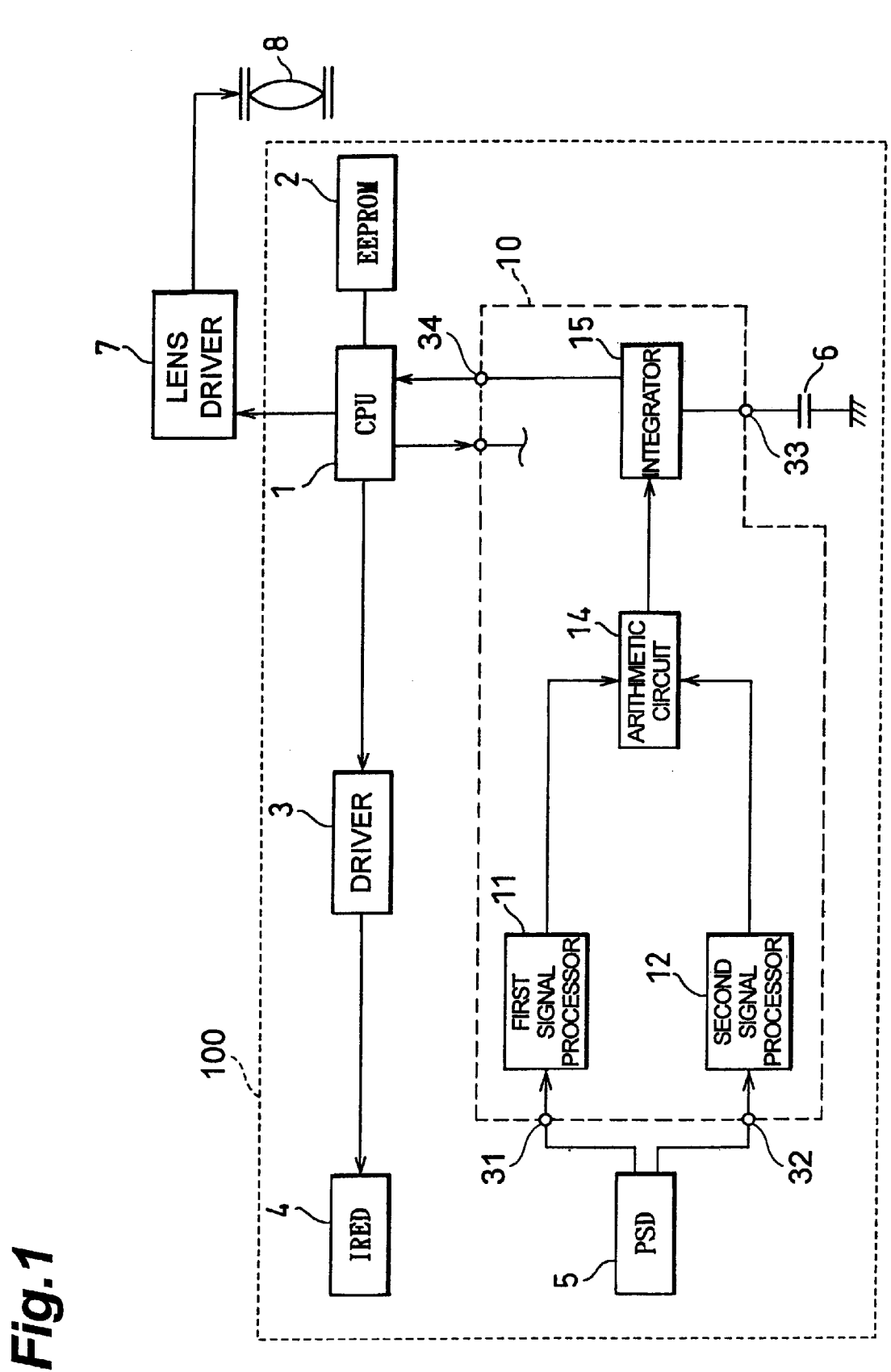
FIG. 1 is a structural diagram of the first embodiment of the distance-measuring apparatus according to the present invention.

FIG. 1 is a structural diagram of the distance-measuring apparatus 100 of the present embodiment. CPU 1 controls the whole of the camera equipped with this distance-measuring apparatus 100 and controls the whole camera including this distance-measuring apparatus 100, based on programs and parameters preliminarily stored in EEPROM 2. In this distance-measuring apparatus 100, the CPU 1 controls a driver 3 to control emission of infrared light from IRED (infrared-emitting diode) 4. The CPU 1 also controls the operation of autofocusing IC (hereinafter referred to as "AFIC") 10 and receives an AF signal outputted from the AFIC 10.

The infrared light emitted from the IRED 4 is projected through a projection lens (not illustrated) placed in front of the IRED 4, toward an object to be measured. The infrared light is reflected in part by the measured object and the reflected light is received somewhere on a photoreceptive surface of PSD 5 through a reception lens (not illustrated) placed in front of the PSD (position sensing device) 5. The light receiving position varies depending upon the distance to the measured object.

The PSD 5 outputs two signals $I_1$ and $I_2$ according to the reception position. The signal $I_1$ is a near-side signal which becomes greater with decrease of the distance to the measured object if optical energy of received light is constant. The signal $I_2$ is a far-side signal which becomes greater with increase of the distance to the measured object if optical energy of received light is constant. The sum of the signals $I_1$ and $I_2$ represents optical energy of the reflected light received by the PSD 5. The near-side signal $I_1$ is sent to a PSDN terminal 31 of the AFIC 10 and the far-side signal $I_2$ to a PSDF terminal 32 of the AFIC 10. In practice, however, the AFIC 10 accepts signals in which a stationary light component $I_0$ is added to each of the near-side signal $I_1$ and the far-side signal $I_2$, depending upon external field conditions.

The AFIC 10 is an integrated circuit (IC) which is composed of a first signal processing circuit 11, a second signal processing circuit 12, an arithmetic circuit 14, and an integrating circuit 15. The first signal processing circuit 11 receives the signal $I_1+I_0$ outputted from the PSD 5 and removes the stationary light component $I_0$ from the signal to output the near-side signal $I_1$. The second signal processing circuit 12 receives the signal $I_2+I_0$ outputted from the PSD 5 and removes the stationary light component $I_0$ from the signal to output the far-side signal $I_2$.

The arithmetic circuit 14 receives the near-side signal $I_1$ outputted from the first signal processing circuit 11 and the far-side signal $I_2$ outputted from the second signal processing circuit 12 and computes an output ratio ($I_1/(I_1+I_2)$) to output an output ratio signal indicating the result of the computation. This output ratio ($I_1/(I_1+I_2)$) indicates the reception position on the photoreceptive surface of PSD 5, i.e., the distance to the measured object.

The integrating circuit 15 receives this output ratio signal and adds up a lot of output ratios in cooperation with an integrating capacitor 6 connected to a $C_{INT}$ terminal 33 of the AFIC 10, to improve an S/N ratio. The integral result of output ratios is outputted as an AF signal from an $S_{OUT}$ terminal 34 of the AFIC 10. The CPU 1 receives the AF signal outputted from the AFIC 10 and converts the AF signal to a distance signal by a predetermined arithmetic to send the distance signal to a lens driving circuit 7. The lens driving circuit 7 moves a taking lens 8 to an in-focus position, based on the distance signal.

Circuit configurations of the first signal processing circuit 11 and integrating circuit 15 of the AFIC 10 will be described in detail below.

Figure 2:
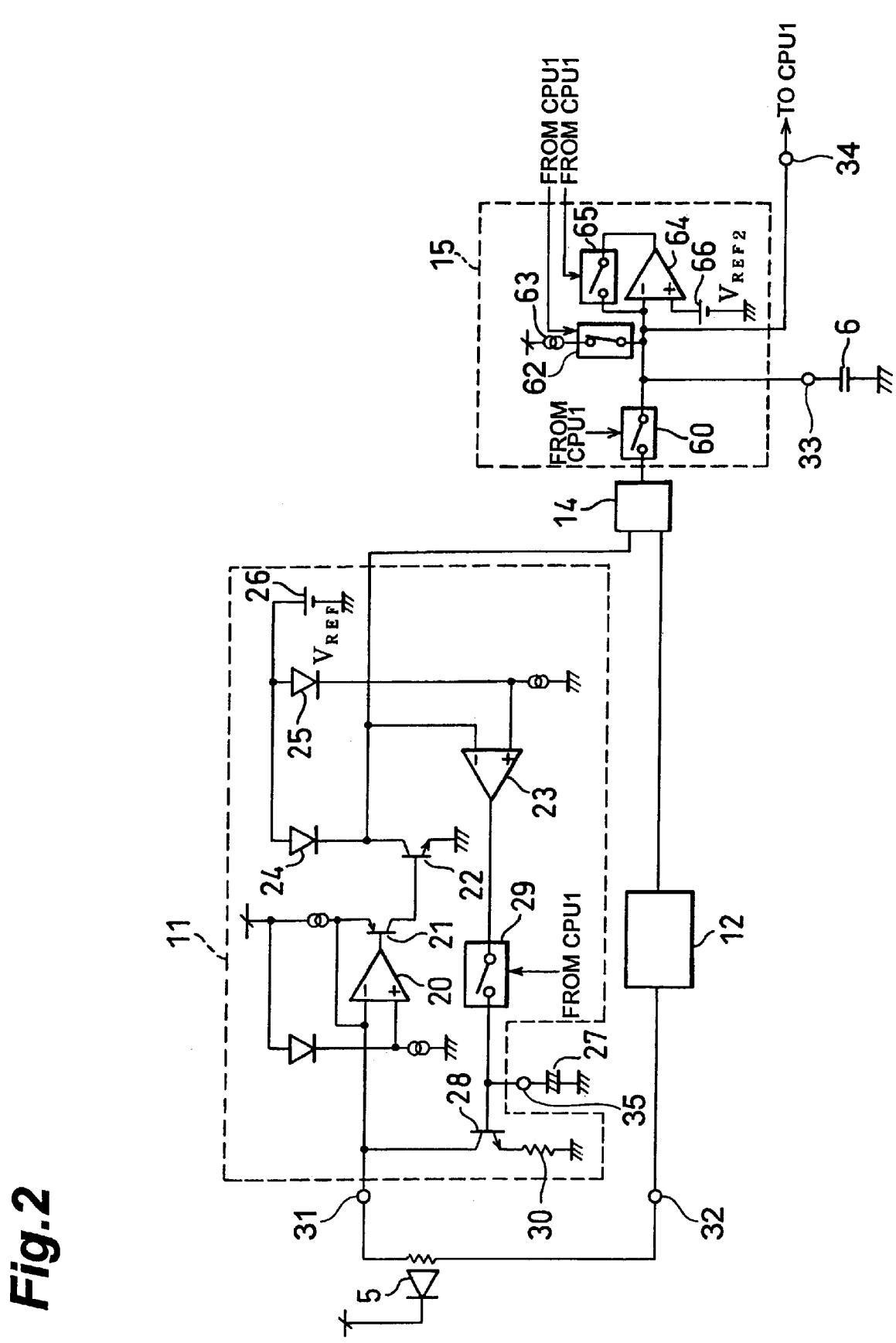
FIG. 2 is a circuit diagram of a first signal processing circuit and an integrating circuit in the distance-measuring apparatus of the first embodiment.

FIG. 2 is a circuit diagram of the first signal processing circuit 11 and the integrating circuit 15. The circuit configuration of the second signal processing circuit 12 is also similar to that of the first signal processing circuit 11. As described above, the first signal processing circuit 11 is the circuit which receives the near-side signal $I_1$ plus the stationary light component $I_0$ outputted from the PSD 5 and removes the stationary light component $I_0$ therefrom to output the near-side signal $I_1$. Namely, a near-side terminal of the PSD 5 is connected via the PSDN terminal 31 of the AFIC 10 to a negative input terminal of an operational amplifier 20 of the first signal processing circuit 11.

An output terminal of the operational amplifier 20 is connected to a base terminal of transistor 21 and a collector terminal of the transistor 21 is connected to a base terminal of transistor 22. A collector terminal of the transistor 22 is connected to a negative input terminal of operational amplifier 23 and also connected to the arithmetic circuit 14. Further, a cathode terminal of compressing diode 24 is connected to the collector terminal of the transistor 22 and a cathode terminal of compressing diode 25 is connected to a positive input terminal of the operational amplifier 23. A power supply 26 is connected to an anode terminal of each of these compressing diodes 24 and 25. The power supply 26 is a constant voltage source for supplying a dc voltage $V_{REF}$.

A capacitor 27 for removing the stationary light is externally attached to a CHF terminal 35 of the AFIC 10, whereby this capacitor 27 for removal of stationary light is connected to a base terminal of transistor 28 for removal of stationary light in the first signal processing circuit 11. The capacitor 27 and the operational amplifier 23 are connected to each other through a switch 29 and the CPU 1 controls on/off of this switch 29. A collector terminal of the transistor 28 for removal of stationary light is connected to the negative input terminal of the operational amplifier 20 and an emitter terminal of the transistor 28 is grounded through a resistor 30.

The integrating circuit 15 has the following configuration. The integrating capacitor 6 externally attached to the $C_{INT}$ terminal 33 of the AFIC 10 is connected through a switch 60 to an output terminal of the arithmetic circuit 14 and through a switch 62 to a constant-current-source 63. The integrating capacitor 6 is also connected through a switch 65 to an output terminal of an operational amplifier 64 and connected directly to a negative input terminal of the operational amplifier 64. Further, a potential of the integrating capacitor 6 is outputted from the $S_{OUT}$ terminal 34 of the AFIC 10. These switches 60, 62, and 65 are controlled by a control signal from the CPU 1. A second reference voltage supply 66 is connected to a positive input terminal of the operational amplifier 64. The reference voltage supply 66 is a dc power supply which supplies the reference voltage $V_{REF2}$.

The schematic action of this AFIC 10 will be described below referring to FIG. 1 and FIG. 2.

The CPU 1 keeps the switch 29 of the first signal processing circuit 11 on while the IRED 4 emits no light. At this time the stationary light component $I_0$ outputted from the PSD 5 is put into the first signal processing circuit 11, and the current thereof is amplified by the current amplifier composed of the operational amplifier 20, the transistor 21, and the transistor 22. The amplified current is logarithmically compressed by the compressing diode 24 to be converted into a voltage signal, and this voltage signal is put into the negative input terminal of the operational amplifier 23. If a large signal enters the operational amplifier 20, the cathode potential of the compressing diode 24 becomes high and thus the operational amplifier 23 outputs a large signal to charge the capacitor 27 for removal of stationary light. Then base current is supplied to the transistor 28, and thus collector current flows in the transistor 28, so as to lower the signal supplied to the operational amplifier 20 among the signal $I_0$ inputted into the first signal processing circuit 11. In a stable state of the operation of this closed loop, all the signal $I_0$ inputted into the first signal processing circuit 11 flows to the transistor 28 and the capacitor 27 for removal of stationary light stores charge corresponding to the base current at that time.

When the CPU 1 turns the switch 29 off with emission of the IRED 4, the stationary light component $I_0$ out of the signal $I_1+I_0$ outputted from the PSD 5 at this time flows as collector current to the transistor 28 to which the base potential is applied by the charge stored in the capacitor 27 for removal of stationary light. The near-side signal $I_1$ is current-amplified by the current amplifier comprised of the operational amplifier 20 and the transistors 21 and 22 and is logarithmically compressed by the compressing diode 24 into a voltage signal to be outputted. Namely, the first signal processing circuit 11 outputs only the near-side signal $I_1$ after the removal of the stationary light component $I_0$ and the near-side signal $I_1$ is supplied to the arithmetic circuit 14. On the other hand, the second signal processing circuit 12 also outputs only the far-side signal $I_2$ after removal of the stationary light component $I_0$, as the first signal processing circuit 11 did, and the far-side signal $I_2$ is supplied to the arithmetic circuit 14.

The near-side signal $I_1$ outputted from the first signal processing circuit 11 and the far-side signal $I_2$ outputted from the second signal processing circuit 12 are put into the arithmetic circuit 14, and the arithmetic circuit 14 computes and outputs the output ratio $(I_1/(I_1+I_2))$. The output ratio is put into the integrating circuit 15. While the IRED 4 emits the predetermined number of pulses, the switch 60 of the integrating circuit 15 is kept on and the switches 62 and 65 off; therefore, the output ratio signal outputted from the arithmetic circuit 14 is stored in the integrating capacitor 6. After the end of the emission of the predetermined number of pulses, the switch 60 is turned off and the switch 65 is turned on. Thus the charge stored in the integrating capacitor 6 decreases because of charge of an opposite potential supplied from the output terminal of the operational amplifier 64.

The CPU 1 monitors the potential of the integrating capacitor 6 to measure the time necessary for a return-to the original potential, obtains the AF signal based on the time, and further computes the distance to the measured object.

Next, the capacitance of the integrating capacitor 6 will be described in detail.

The capacitance of the integrating capacitor 6 is set so that the integrating capacitor 6 is discharged to the maximum under the condition in which the time necessary for the first integral described hereinafter becomes minimum when the output ratio signal outputted from the arithmetic circuit 14 is maximum. For example, the following relation of Eq (1) holds, where the capacitance of the integrating capacitor 6 is. C, the voltage that can be utilized during the discharge of the integrating capacitor 6 is $V_{MAX}$, a discharge current value at the maximum output-ratio in the first integral is I, and the time necessary for the discharge in the first integral is T.

$$C \cdot V_{MAX} = I \cdot T \qquad (1)$$

Let us suppose here that the voltage $V_{MAX}$ that can be utilized for the discharge is 0.97 V, the discharge current value at the maximum output ratio is 7.8 μA, and the discharge time T is 2600 μs. Then the capacitance C of the integrating capacitor 6 is about 0.021 μF. Therefore, a capacitor having the capacitance of 0.022 μF may be employed as the integrating capacitor 6.

This setting of the capacitance of the integrating capacitor 6 permits the dischargeable dynamic range of the integrating capacitor 6 to be utilized to the maximum even if the time necessary for the first integral during the distance measurement is minimum. Therefore, the distance measurement accuracy can be improved.

The discharge time T is a discharge time when the time necessary for the first integral is minimum. For example, the discharge time is determined by a discharge time for emission of each pulse and the number of pulses emitted for output of one distance measurement result. When the discharge time for emission of each pulse is 26 μs and the number of pulses emitted for output of one distance measurement result is 100, the discharge time T is computed as follows; 26 μs×100=2600 μs.

Figure 3:
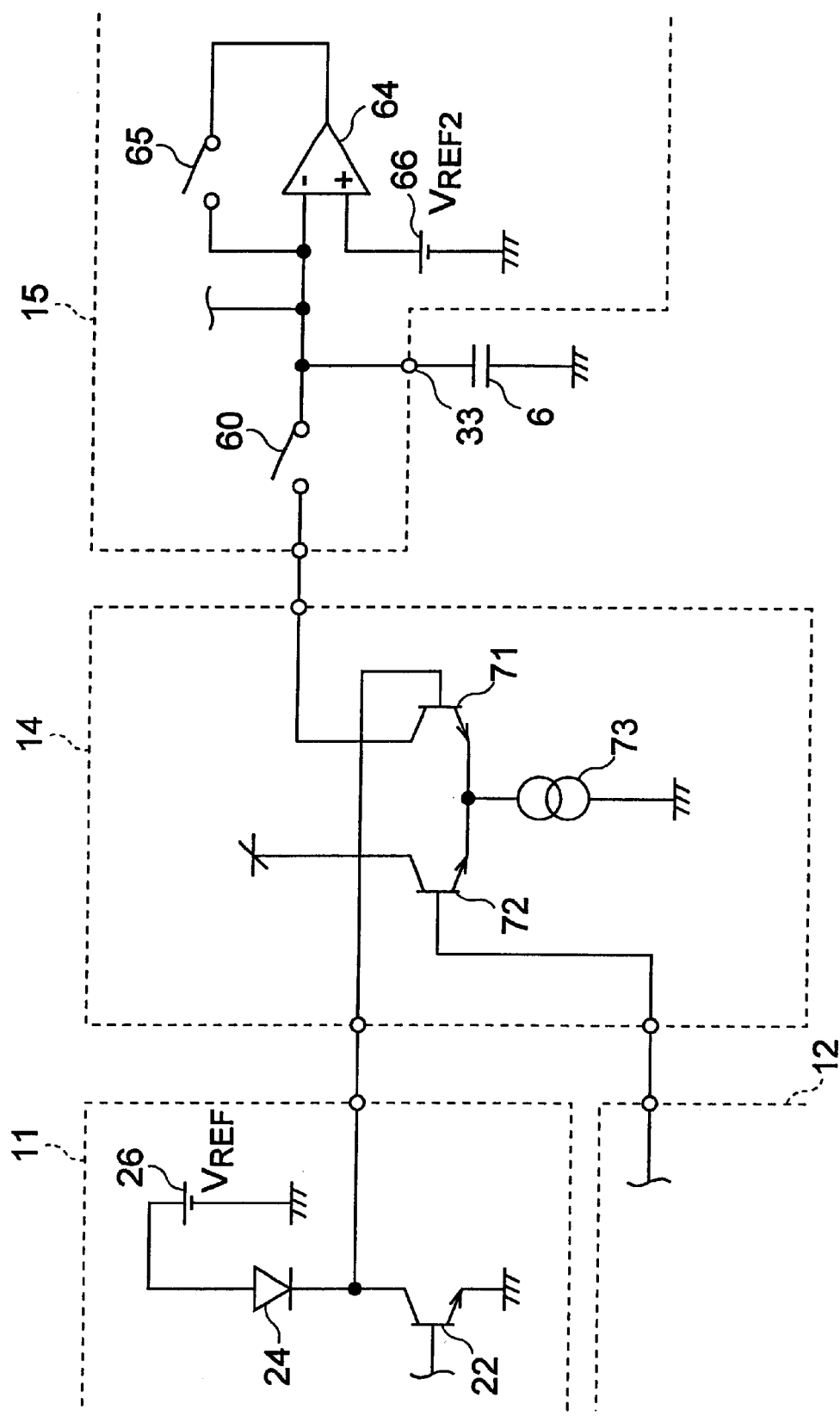
FIG. 3 is a circuit diagram for explaining the voltage that can be utilized for discharge of the integrating capacitor.

The voltage $V_{MAX}$ that can be utilized for the discharge is determined as follows, for example. As illustrated in FIG. 3, where a differential circuit including two transistors 71, 72 and a constant-current source 73 is used as the arithmetic circuit 14, the integrating capacitor 6 is first charged by the reference voltage $V_{REF2}$ of the second reference voltage supply 66 prior to the first integral. Then the compressing diode 24, receiving the supply of the reference voltage $V_{REF}$ from the power supply 26, logarithmically compresses the near-side signal $I_1$ by action of the transistor 22 to output the result from the first signal processing circuit 11. The transistor 71 is activated based on the near-side signal $I_1$ etc., and the action thereof starts discharging the integrating capacitor 6. In this case, the voltage (dynamic range) $V_{MAX}$ that can be utilized in the integrating capacitor 6 can be expressed by Eq (2) below.

$$V_{MAX}=V_{REF}-(V_{REF2}-V_D-V_{QBE}+V_{QCE}) \quad (2)$$

In the above equation, $V_D$ is the forward voltage of the compressing diode 24, $V_{QBE}$ the voltage between the base and the emitter of the transistor 71, and $V_{QCE}$ the voltage between the collector and the emitter of the transistor 71. For example, let $V_{REF}$ be 1.5 V, $V_{REF2}$ be 1.63 V, $V_D$ be 0.6 V, $V_{QBE}$ be 0.6 V, and $V_{QCE}$ be 0.1 V; then $V_{MAX}$ is 0.97 V from Eq (2).

Next, the operation of the distance-measuring apparatus of the present embodiment will be described.

First described is the operation of the distance-measuring apparatus carried out when the time necessary for the first integral during the distance measurement is set to the minimum (for example, when the number of pulses emitted from the IRED is 100). FIG. 4A to FIG. 4C are timing charts; FIG. 4A shows the charging voltage of the integrating capacitor 6, FIG. 4B the operation of the switch 65, and FIG. 4C the operation of the switch 62.

When the shutter release button of the camera is depressed by a half stroke to enter the distance-measuring state, the supply of the power-supply voltage is restarted to the AFIC 10 to turn the switch 65 on, whereupon the reference voltage $V_{REF2}$ is applied to the integrating capacitor 6 to charge it. This charge promotes the dielectric polarization of the integrating capacitor 6. After a lapse of a fixed time since the start of the charge of the integrating capacitor 6, the switch 65 is turned off to terminate the charge. Then the driver 3 is actuated by a signal from the CPU 1 to make the IRED 4 emit pulses of infrared light.

The infrared light emitted from the IRED 4 is reflected by the measured object and thereafter received by the PSD 5. On the other hand, at the same time as the emission of the IRED 4, the switch 29 of the first signal processing circuit 11 is turned off to put the near-side signal $I_1$ after the removal of the stationary light component $I_0$ into the arithmetic circuit 14. Similarly, the far-side signal $I_2$ after the removal of the stationary light component $I_0$ is supplied from the second signal processing circuit 12 into the arithmetic circuit 14.

The arithmetic circuit 14 outputs the data of output ratio $I_1/(I_1+I_2)$ based on the near-side signal $I_1$ and far-side signal $I_2$. As soon as this output becomes stable, the switch 60 of the integrating circuit 15 is turned on to put the negative voltage corresponding to the output ratio outputted from the arithmetic circuit 14, into the integrating capacitor 6.

The switch 60 of the integrating circuit 15 is turned off at the same time as off of the IRED 4. After a lapse of a signal error time, the switch 29 of the first signal processing circuit 11 is turned on to start storage of the stationary light component $I_0$ of the output signal outputted from the PSD 5, in the capacitor 27 for removal of stationary light.

The integrating capacitor 6 of the integrating circuit 15 accepts the output ratio or distance information signal outputted from the arithmetic circuit 14 to discharge by a voltage value according to a value of the distance information signal. Namely, as illustrated in FIG. 4A, the distance information signal enters the integrating capacitor 6 every emission of a pulse from the IRED 4 to decrease the voltage of the integrating capacitor 6 stepwise (first integral). A voltage drop amount of each step itself is distance information corresponding to the distance to the measured object, but in the present embodiment the distance information is obtained as the sum of voltage drop amounts obtained by emission of respective pulses from the IRED 4.

After completion of the input by the predetermined number of emissions to the integrating capacitor 6, the switch 60 is kept off and the switch 62 is turned on by a signal from the CPU 1. This causes the integrating capacitor 6 to charge at a constant rate determined by the rating of the constant-current source 63 (second integral).

During the period of this second integral the voltage of the integrating capacitor 6 is compared with the reference.voltage $V_{REF2}$ and the charging of the integrating capacitor 6 is terminated by turning the switch 62 off with agreement between them. The CPU 1 measures the time necessitated for the second integral. Since the charging rate by the constant-current source 63 is constant, the distance to the measured object can be computed from the time required for the second integral.

Next described is the operation of the distance-measuring apparatus carried out when the time necessary for the first integral during the distance measurement is set longer than the minimum time because of object conditions such as the reflectance or the like (for example, when the number of pulses emitted from the IRED is 200). FIG. 5A to FIG. 5C are timing charts; FIG. 5A shows the charging voltage of the integrating capacitor 6, FIG. 5B the operation of the switch 65, and FIG. 5C the operation of the switch 62.

When the shutter release button of the camera is depressed by a half stroke to enter the distance-measuring state, the supply of the power-supply voltage is restarted to the AFIC 10 in the same manner as described above to turn the switch 65 on, whereupon the reference voltage $V_{REF2}$ is applied to the integrating capacitor 6 to charge it. Then the switch 65 is turned off to terminate the charge. The driver 3 is actuated by a signal from the CPU 1 to make the IRED 4 emit pulses of infrared light. The infrared light emitted from the IRED 4 is reflected by the measured object and thereafter received by the PSD 5. On the other hand, at the same time as the emission of the IRED 4, the switch 29 of the first signal processing circuit 11 is turned off to put the near-side signal $I_1$ after the removal of the stationary light component $I_0$ into the arithmetic circuit 14. Similarly, the far-side signal $I_2$ after the removal of the stationary light component $I_0$ is supplied from the second signal processing circuit 12 into the arithmetic circuit 14.

The arithmetic circuit 14 outputs the data of output ratio $I_1/(I_1+I_2)$ based on the near-side signal $I_1$ and far-side signal $I_2$. As soon as this output becomes stable, the switch 60 of the integrating circuit 15 is turned on to put the negative voltage corresponding to the output ratio outputted from the arithmetic circuit 14, into the integrating capacitor 6.

The switch 60 of the integrating circuit 15 is turned off at the same time as off of the IRED 4. After a lapse of the signal error time, the switch 29 of the first signal processing circuit 11 is turned on to start storage of the stationary light component $I_0$ of the output signal outputted from the PSD 5, in the capacitor 27 for removal of stationary light.

The integrating capacitor 6 of the integrating circuit 15 accepts the output ratio or distance information signal outputted from the arithmetic circuit 14 to discharge by a voltage value according to a value of the distance information signal. Namely, as illustrated in FIG. 5A, the distance information signal enters the integrating capacitor 6 every emission of a pulse from the IRED 4 to decrease the voltage of the integrating capacitor 6 stepwise (first integral). A voltage drop amount of each step itself is distance information corresponding to the distance to the measured object, but in the present embodiment the distance information is obtained as the sum of voltage drop amounts obtained by emission of respective pulses from the IRED 4.

After completion of the input by the predetermined number of emissions (for example, 100 pulses) to the integrating capacitor 6, the switch 60 is turned off and the switch 62 is turned on by a signal from the CPU 1. This causes the integrating capacitor 6 to charge at the constant rate determined by the rating of the constant-current source 63 (second integral).

During the period of this second integral the voltage of the integrating capacitor 6 is compared with the reference voltage $V_{REF2}$ and the charging of the integrating capacitor 6 is terminated by turning the switch 62 off with agreement between them.

After that, the driver 3 is actuated again by a signal from the CPU 1 to make the IRED 4 emit pulses, and the reflected light from the measured object is received by the PSD 5. On the other hand, at the same time as the emission of the IRED 4, the switch 29 of the first signal processing circuit 11 is turned off, whereupon the near-side signal $I_1$ after the removal of the stationary light component $I_0$ is put into the arithmetic circuit 14. Similarly, the far-side signal $I_2$ after the removable of the stationary light component $I_0$ is also supplied from the second signal processing circuit 12 to the arithmetic circuit 14.

The arithmetic circuit 14 outputs the data of output ratio $I_1/(I_1+I_2)$ based on these near-side signal $I_1$ and far-side signal $I_2$. As soon as this output becomes stable, the switch 60 of the integrating circuit 15 is turned on, whereupon a negative voltage corresponding to the output ratio outputted from the arithmetic circuit 14 is put into the integrating capacitor 6.

Then the switch 60 of the integrating circuit 15 is turned off at the same time as off of the IRED 4. The switch 29 of the first signal processing circuit 11 is turned on after a lapse of the signal error time, whereby the capacitor 27 for removal of stationary light starts storage of the stationary light component $I_0$ of the output signal outputted from the PSD 5.

The integrating capacitor 6 of the integrating circuit 15 accepts the output ratio or distance information signal outputted from the arithmetic circuit 14 to discharge by a voltage value according to a value of the distance information signal. Namely, the voltage of the integrating capacitor 6 decreases stepwise with input of the distance information signal every emission of a pulse from the IRED 4 (first integral), as illustrated in FIG. 5A.

After completion of input by the predetermined number of emissions to the integrating capacitor 6, the switch 60 is turned off and the switch 62 is turned on by a signal from the CPU 1. This causes the integrating capacitor 6 to charge at the constant rate determined by the rating of the constant-current source 63 (second integral). During the period of this second integral the comparator 64 compares the voltage of the integrating capacitor 6,with the reference voltage $V_{REF2}$, and the switch 62 is turned off to terminate the charge of the integrating capacitor 6 with agreement between them.

The CPU 1 measures the time necessary for the second integral in the first measurement and in the second measurement and thereafter. Since the charging rate by the constant-current source 63 is constant, the distance to the measured object can be computed from the total time for all the second integrals and the number of first integrals.

When the shutter release button is depressed thereafter by a full stroke, the CPU 1 controls the lens driving circuit 7, based on the distance thus obtained, to move the taking lens 8 to an appropriate in-focus position and then opens the shutter (not illustrated) to effect exposure. With the shutter release operation, the series of photographing operations, including the precharge, distance measurement (first integral and second integral), focusing, and exposure, are carried out in the above-stated manner.

As described above, since the capacitance of the integrating capacitor 6 is set so as to be discharged to the maximum when the time necessary for the first integral is minimum, the distance-measuring apparatus 100 of the present embodiment can maximize the utilization of the dischargeable dynamic range of the integrating capacitor 6 even if the time necessary for the first integral during the distance measurement is minimum. Therefore, the distance measurement can be carried out with good accuracy.

When the time necessary for the first integral is longer than the minimum time, the first integral and second integral are carried out repeatedly, whereby the distance to the measured object can be measured with accuracy.

Figure 5D:
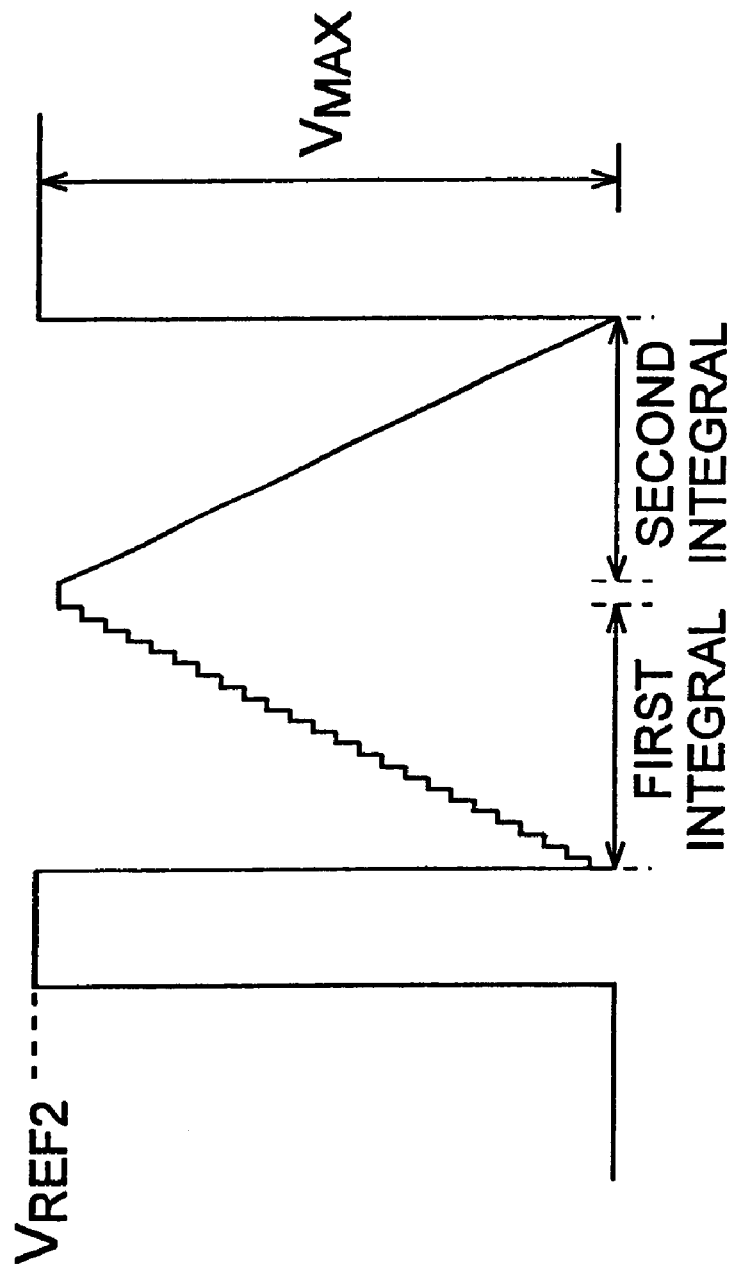
FIG. 5D is an explanatory diagram to illustrate the operation of a modification of the distance-measuring apparatus of the first embodiment.

It is noted that the present invention is by no means limited to the above embodiment but can involve various modifications and changes. For example, the present invention can also be applied to cases in which the charge and discharge of the integrating circuit are reverse to those in the above embodiment, as illustrated in FIG. 5D, i.e., to the integrating circuits in which the integrating capacitor is charged in plural steps so as to increase the voltage stepwise in the first integral and thereafter the integrating capacitor is discharged in a single step in the second integral.

Second Embodiment

The distance-measuring apparatus of the second embodiment will be described below.

The distance-measuring apparatus of the present embodiment has almost similar structure and performs almost similar operation to the distance-measuring apparatus of the first embodiment illustrated in FIG. 1 and FIG. 2, but the present embodiment is different from the first embodiment in that discharge current values in the first integral are changed over according to the distance measurement conditions as occasion may demand.

Figure 6:
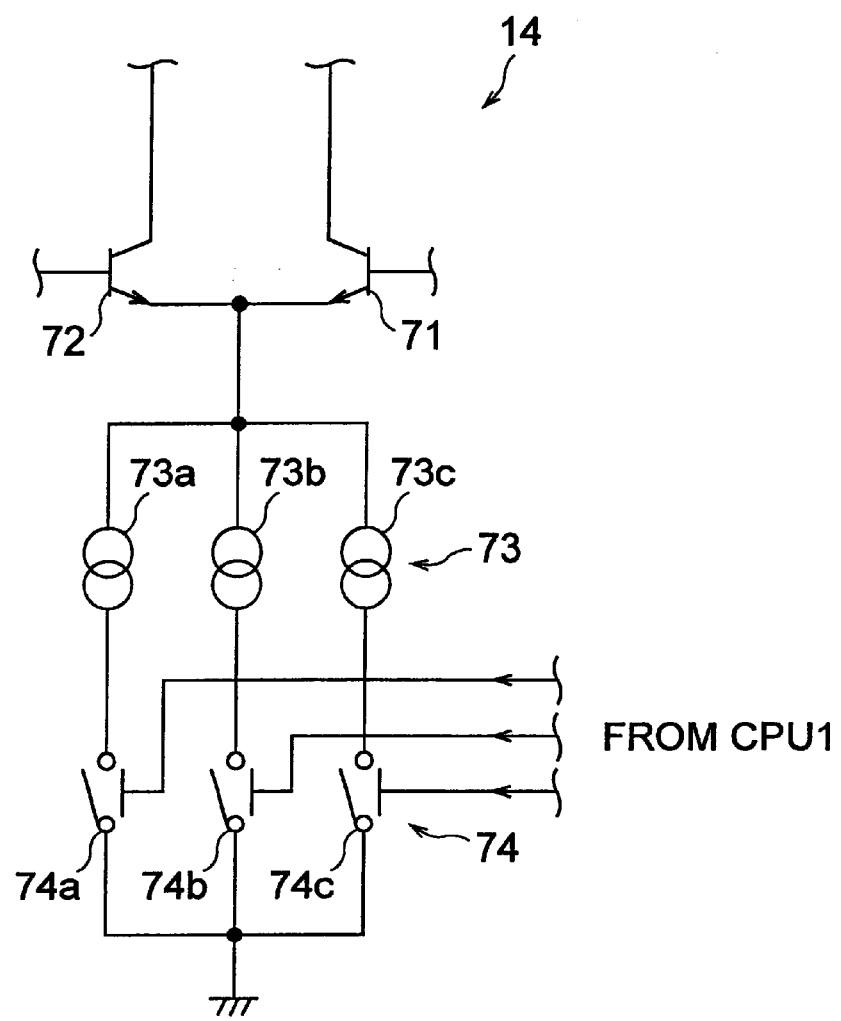
FIG. 6 is a structural diagram of the second embodiment of the distance-measuring apparatus according to the present invention.

FIG. 6 shows the arithmetic circuit of the distance-measuring apparatus of the present embodiment. As illustrated in FIG. 6, the arithmetic circuit 14 in the distance-measuring apparatus of the present embodiment has the transistor 71 and the transistor 72 whose emitter terminals are connected to each other. Connected to each emitter terminal thereof are a plurality of constant-current sources 73 (73a, 73b, 73c) of different current values. Each constant-current source 73 is grounded via a switch 74 (74a, 74b, or 74c).

In this arithmetic circuit 14, either one of the switches 74a, 74b, 74c is turned on by a signal from the CPU 1 and in response to the on state either one of the constant-current sources 73a, 73b, 73c is thus used for supplying the discharge current of the integrating capacitor 6 in the first integral.

Let Ia be the current of the constant-current source 73a, Ib be the current of the constant-current source 73b, and Ic be the current of the constant-current source 73c. Then these currents Ia, Ib, Ic are determined as follows. Let us suppose that the capacitance of the integrating capacitor 6 is 0.068 $\mu$F, the voltage (dynamic range) $V_{MAX}$ that can be utilized in the integrating capacitor 6 is 0.9 V, and the first integral time is changed over among 7800 $\mu$s, 3900 $\mu$s, and 2600 $\mu$s, depending upon the distance measurement conditions and the like. When the first integral time is 7800 $\mu$s, the discharge current value is 7.8 $\mu$A from Eq (1) stated above. When the first integral time is 3900 $\mu$s, the discharge current value is 15.6 $\mu$A from above Eq (1). Further, when the first integral time is 2600 $\mu$s, the discharge current value is 23.4 $\mu$A from above Eq (1).

Therefore, when the apparatus is constructed so that the current Ia of the constant-current source 73a is 7.8 $\mu$A, the current Ib of the constant-current source 73b is 15.6 $\mu$A, the current Ic of the constant-current source 73c is 23.4 $\mu$A, and either one of the constant-current sources 73a, 73b, 73c is properly selected with change of the first integral time depending upon the distance measurement conditions and the like, the apparatus can perform the distance measurement while maximizing the utilization of the dischargeable dynamic range of the integrating capacitor 6. Therefore, the distance measurement can be carried out with good accuracy.

Although the present embodiment was described in the form using the three constant-current-sources 73, it should be noted that the distance-measuring apparatus according to the present invention is not limited to this form but may be constructed in various forms using two or four or more constant-current sources 73.

Third Embodiment

The distance-measuring apparatus of the third embodiment will be described below.

The distance-measuring apparatus of the present embodiment has almost similar structure and performs almost similar operation to the distance-measuring apparatus of the first embodiment illustrated in FIG. 1 and FIG. 2, but the present embodiment is different from the first embodiment in that either one of integrating capacitors of different capacitances is properly selected in the first integral and the second integral, depending upon the distance measurement conditions, as occasion may demand.

Figure 7:
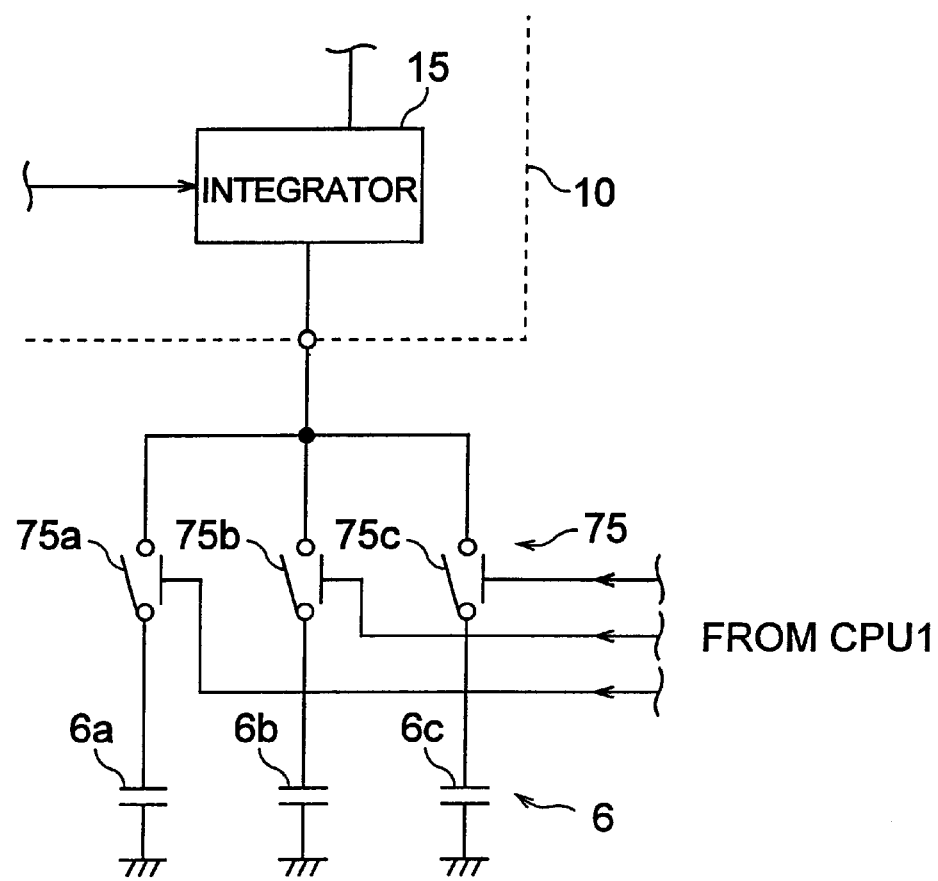
FIG. 7 is a structural diagram of the third embodiment of the distance-measuring apparatus according to the present invention.

FIG. 7 is an explanatory diagram to show the integrating capacitors in the distance-measuring apparatus of the present embodiment. As illustrated in FIG. 7, the distance-measuring apparatus of the present embodiment has a plurality of integrating capacitors 6 (6a, 6b, 6c) of different capacitances. Each integrating capacitor 6 is connected via a switch 75 (75a, 75b, or 75c) to the integrating circuit 15.

When either one of the switches 75a, 75b, 75c is turned on by a signal from the CPU 1, either one of these integrating capacitors 6a, 6b, 6c is selectively connected to the integrating circuit 15 in response to the on state to be used in the first integral and the second integral.

Let Ca be the capacitance of the integrating capacitor 6a, Cb be the capacitance of the integrating capacitor 6b, and Cc be the capacitance of the integrating capacitor 6c. Then these capacitances Ca, Cb, Cc are determined as follows. Suppose that the discharge current in the first integral is 7.8 $\mu$A, the voltage (dynamic range) $V_{MAX}$ that can be utilized in the integrating capacitor 6 is 0.93 V, and the first integral time is changed over among 7800 $\mu$s, 3900 $\mu$s, and 2600 $\mu$s, depending upon the distance measurement conditions and the like. When the first integral time is 7800 $\mu$s, the capacitance of the integrating capacitor is about 0.068 $\mu$F from Eq (1) described above in order to carry out the distance measurement while maximizing the utilization of the dynamic range of the integrating capacitor 6. When the first integral time is 3900 $\mu$s, the capacitance of the integrating capacitor is about 0.033 $\mu$F from above Eq (1) in order to carry out the distance measurement while maximizing the utilization of the dynamic range of the integrating capacitor 6. Further, when the first integral time is 2600 $\mu$s, the capacitance of the integrating capacitor is about 0.022 $\mu$F from above Eq (1) in order to carry out the distance measurement while maximizing the utilization of the dynamic range of the integrating capacitor 6.

When the apparatus is arranged so that the capacitance Ca of the integrating capacitor 6a is. 0.068 $\mu$F, the capacitance Cb of the integrating capacitor 6b is 0.033 $\mu$F, the capacitance Cc of the integrating capacitor 6c is 0.022 $\mu$F, and either one of the integrating capacitors 6a, 6b, 6c is properly selected with change of the first integral time depending upon the distance measurement conditions and the like, the apparatus can perform the distance measurement while maximizing the utilization of the dischargeable dynamic range of each integrating capacitor 6 accordingly. Therefore, the distance measurement can be carried out with good accuracy.

The present embodiment was described in the form using the three integrating capacitors 6, but the distance-measuring apparatus according to the present invention is not limited to this form. The distance-measuring apparatus of the present invention may also be constructed in various forms using two or four or more integrating capacitors 6.

As described above, the present invention permits the maximum utilization of the dischargeable or chargeable dynamic range of the integrating capacitor on the occasion of execution of the first integral. The distance measurement accuracy can be improved accordingly.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A distance-measuring apparatus comprising:

light projecting means for projecting pulses of light toward an object at a distanced to be measured;

light detecting means for detecting light of said light projected toward and reflected from the object, at a photoreceptive position on a position sensing device according to the distance to the object and outputting a signal according to the photoreceptive position;

arithmetic means for carrying out an arithmetic operation based on the signal outputted from said light detecting means and outputting an output ratio signal according to the distance to the object;

integrating means comprising an integrating capacitor, said integrating means carrying out a first integration in which the signal outputted from said arithmetic means is integrated by discharging/charging said integrating capacitor according to the signal output from said arithmetic means and, thereafter, carrying out a second integration by charging/discharging said integrating capacitor with a constant current, said integrating means comparing a voltage of said integrating capacitor with a reference voltage during the second integration and outputting a comparison result signal according to a result of the comparison; and detecting means for detecting the distance to the object, based on the signal output from said integrating means, wherein said integrating means comprises a plurality current sources having different output currents and said integrating means carries out the first integration with one of said current sources to discharge/charge the integrating capacitor to a maximum in detection of the distance to the object.

2. The distance-measuring apparatus according to claim 1, for focusing a lens.

3. The distance-measuring apparatus according to claim 1, wherein said light projecting means is an infrared-emitting diode.

4. The distance-measuring apparatus according to claim 1, wherein said light detecting means outputs a near-side signal which increases with decreasing distance to the object and a far-side signal which increases with increasing distance to the object.

5. The distance-measuring apparatus according to claim 1, wherein said arithmetic means outputs the output ratio signal based on a ratio of the near-side signal and the far-side signal.

6. The distance-measuring apparatus according to claim 1, wherein the arithmetic means and the integrated means are integrated in a single autofocusing integrated circuit.

* * * * *